United States Patent [19]

Lee et al.

[11] 4,420,585

[45] Dec. 13, 1983

[54] METHOD OF MIXING ELASTOMERIC POLYMERS FOR IMPROVED PHYSICAL PROPERTIES

[75] Inventors: Michael C. H. Lee, Sterling Heights; Darrel S. Nelson, Warren, both of Mich.

[73] Assignee: General Motors Corporation, Detroit, Mich.

[21] Appl. No.: 412,545

[22] Filed: Aug. 30, 1982

[51] Int. Cl.³ .................. C08K 3/04; C08K 3/36; C08L 7/00; C08L 11/00

[52] U.S. Cl. .................. 524/548; 523/307; 524/552; 524/571; 524/580; 260/756; 260/762; 260/763; 260/767

[58] Field of Search .............. 524/548, 552, 571, 580; 523/307; 260/756, 763, 762, 767

[56] References Cited

U.S. PATENT DOCUMENTS 4,285,897 8/1981 Zakaria et al. .................. 524/526

4,342,670 8/1982 Ahagon et al. .................. 524/526

Primary Examiner—John C. Bleutge
Assistant Examiner—Herbert J. Lilling
Attorney, Agent, or Firm—Elizabeth F. Harasek

[57] ABSTRACT

A method of mixing crosslinkable elastomeric polymers and reinforcing fillers has been developed that yields significant improvements in physical properties compared to like polymers mixed by conventional methods. The method entails working a filler-polymer mixture at a temperature between the glass transition temperature and the liquid-liquid temperature of the uncrosslinked polymer to enhance filler integration. The mixture is then heated to a temperature greater than the flow temperature of the uncrosslinked polymer and worked so that air bubbles dispersed in the mixture are eliminated. The heating and cooling steps are repeated until the filler particles are thoroughly integrated and substantially all air bubbles are eliminated.

9 Claims, 6 Drawing Figures

○ HIGH SHEAR MIXING
△ HIGH SHEAR & EXTRUSION

METHOD OF MIXING ELASTOMERIC POLYMERS FOR IMPROVED PHYSICAL PROPERTIES

This invention relates to a method of mixing viscous uncrosslinked elastomeric polymers and reinforcing fillers to improve the physical properties of crosslinked elastomeric articles molded therefrom.

BACKGROUND

Elastomer polymers exhibit many useful mechanical properties such as elastic recovery after deformation, energy absorbing capacity, impermeability to fluids, etc. Examples of automotive applications for elastomers include tires, fluid hoses, engine mounts, and grease seals. However, the complexity of interactions between polymers and fillers in elastomer systems makes the formulation of a composition tailored to a specific need very difficult. For example, the ultimate tensile strength and elongation of a given filled elastomer will depend on the mixing process used. Poor mixing may reduce or even cancel out the strengthening properties of a particulate filler in an elastomer. Good mixing, on the other hand, can substantially improve properties such as tensile strength, elongation and elasticity at low temperatures. Heretofore, trial and error methods have been used to improve the inherent properties of elastomer compositions to use them in engineering applications. In many cases, the use of a particular elastomer in a particular situation has been limited by the ability to incorporate suitable reinforcing fillers.

It is therefore the primary object of this invention to provide an improved method of mixing reinforcing fillers with elastomeric polymers to provide molded products with improved physical characteristics.

BRIEF SUMMARY

This and other objects may be accomplished in accordance with a preferred practice of the invention by sheeting a gum stock of an elastomeric rubber polymer such as polychloroprene onto a conventional two-roll rubber mill. An amount of a particulate reinforcing filler such as carbon black is worked into the rubber either before or after it is sheeted onto the mill.

The subject invention differs from conventional rubber mixing practices in that the gum stock is successively subjected to controlled heating and cooling cycles while it is worked. The key to the subject invention is sequentially working the rubber gum stock at a first elevated temperature higher than the flow temperature of the polymer and then cooling the stock to a temperature between the glass transition temperature and the liquid-liquid transition temperature of the polymer. Working the material at the elevated temperature decreases the viscosity of the polymer matrix so that any entrapped air is squeezed out. During the cooling cycle, the modulus of the gum is substantially increased. This increases the local sheer stress of mixing, breaking down any agglomerates of filler particles and promoting the wetting of individual filler particles with polymer. By repeating such heating and cooling cycles, the desired degree of filler - elastomer integration and a nearly total elimination of microvoids can be accomplished.

Crosslinked articles molded from gum stocks worked in this manner exhibit such improved physical properties as higher modulus, higher tensile strength higher ultimate elongation, greater fatigue life, and decreased permeability to organic liquids.

I have also discovered that the effects of this mixing method can be enhanced even further when carbon black is the filler constituent when the carbon black is attrited before it is added. Attrition reduces the size of the individual carbon black particles and reduces their pH. The reduced pH increases the compatibility of the carbon black particles and polymer so that strong permanent bonds form between them during the mixing process. My invention will be better understood in view of the detailed description which follows.

DETAILED DESCRIPTION

Figure 5:
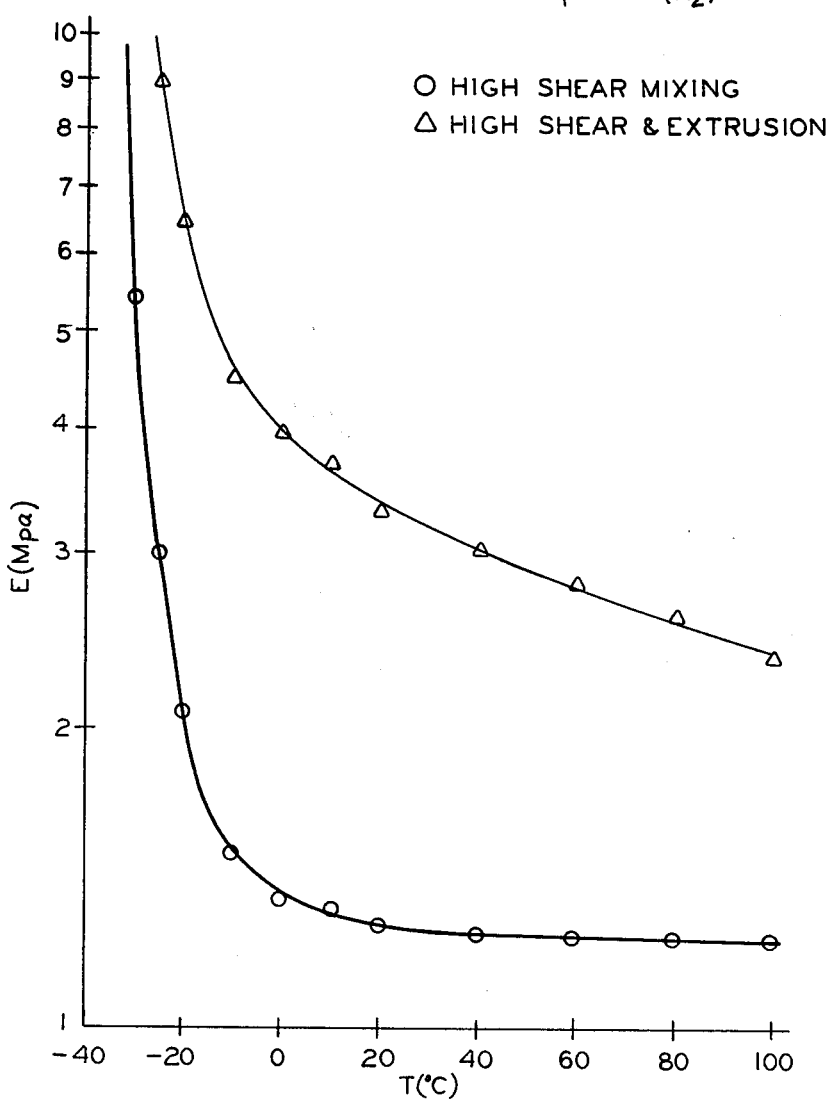

FIG. 5 compares the storage modulus as a function of temperature for neoprene mixed by the subject method in a shear mixer alone (circles) and in a high shear mixer and an extruder (triangles).

A preferred practice of my invention is set forth in the following examples.

EXAMPLE 1

The rubber used in this example was polychloroprene marketed as Neoprene W by DuPont. Two types of filler were used, a conventional ASTM N330 carbon black and attrited N330 carbon black. The attrition of the carbon black was accomplished by first oven heating the black at 150° C. for 24 hours then ball-milling it at 125°–225° C. for 48 hours. The amount of the carbon black put into the ball mill was about one-third the volume of the milling container.

TABLE I

| Compositions of Polychloroprene for the Present Study | |
|---|---|
| Polychloroprene (Neoprene W) | 100 |
| Filler* | 30 |
| MgO | 4 |
| ZnO | 5 |
| Stearic Acid | 0.5 |
| Ethylene Thiourea | 0.7 |
| Sulfur | 0.5 |

*N330 carbon black is used for common polychloroprene, and attrited N330 carbon black is used for hot and cold worked polychloroprene.

The composition of the polychloroprene elastomer gum stock of this example is set out in Table I and the properties of the N330 carbon black are set out in Table II.

TABLE II

| Changes in the Properties of Carbon Black after Attrition | | |
|---|---|---|
| Properties | Before Attrition | After Attrition |
| Particle Size [A] | 80 | 50 |
| pH | 8.1 | 3.4 |

TABLE II-continued

Changes in the Properties of Carbon Black after Attrition

| Properties | Before Attrition | After Attrition |
|---|---|---|
| Solid/liquid surface energy ($\gamma_{sv}$) (dyne/cm) | 44.0 | 34.0 |

The subject method is a departure from ordinary rubber compounding procedures. The ordinary procedure is to mix the carbon black or other particulate filler into the polychlorprene or other elastomer gum stock for about seven minutes beginning at about room temperature and gradually increasing the milling temperature to about 110° C. by the combined effects of working of the rubber and introducing heating fluids into the rollers of the rubber mill.

In my mixing method, I used attrited N330 carbon black in conjunction with heating and cooling mixing cycles to prepare improved polychloroprene compositions. Polychloroprene with the same molecular weight distribution as that of the conventionally prepared polychloroprene was used. The steps and conditions of the subject mixing method are summarized in Table III.

TABLE III

Improved Mixing Procedure

| Mixing Step | Time Period | Temperature |
|---|---|---|
| 1. Mixing of polymers | 2 min | 30° C. |
| 2. First cooling cycle for mixing polymer and carbon black | 4 min | 10° C. |
| 3. First heating cycle for mixing polymer and carbon black | 4 min | 100° C. |
| 4. Second cooling cycle for mixing polymer and carbon black | 3 min | 10°0 C. |
| 5. Second heating cycle for mixing polymer and carbon black | 3 min. | 100° C. |
| 6. Low temperature mixing of oil and curatives with the elastomers | 1 min | 30° C. |

Figure 1:
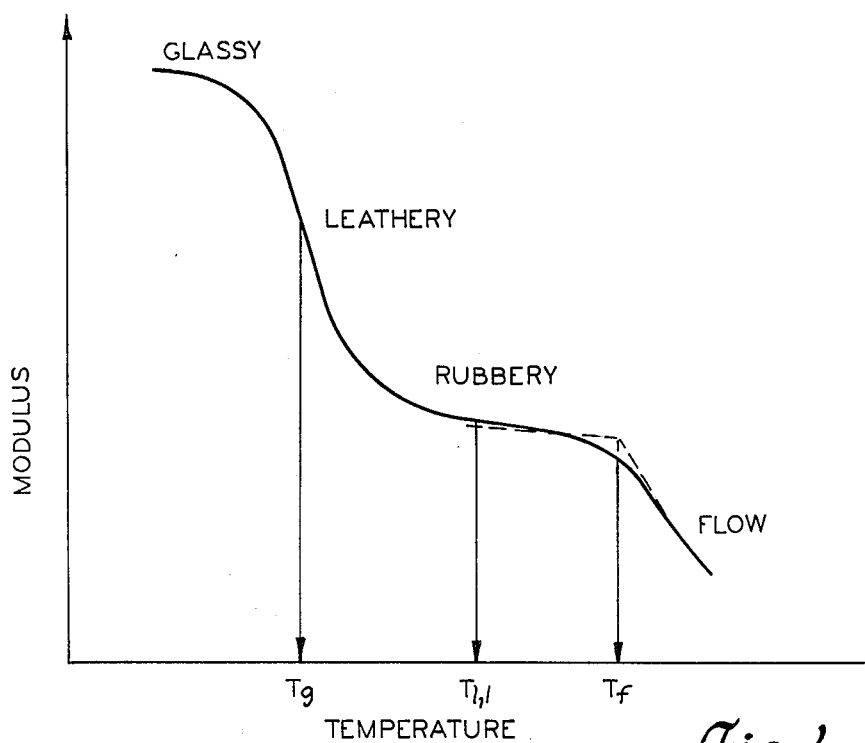
FIG. 1 is a plot of modulus as a function of temperature typical of elastomeric polymer gum stocks.

The procedure of this example entailed two heating cycles and two cooling cycles. Referring to FIG. 1, three characteristic temperatures can generally be identified for a polymeric elastomer gum stock (i.e., the polymer before it is finally crosslinked and cured). These are the glass transition temperature, $T_g$, the liquid-liquid transition temperature, $T_{l,l}$, and a defined flow temperature, $T_f$. The $T_g$ and $T_{l,l}$ can be measured by differential scanning calorimetry (DSC). However, as a rule of thumb, the liquid-liquid transition temperature is generally about 1.2 times the measured glass transition temperature on the Kelvin temperature scale. The flow temperature depends to some extent on the molecular weight of a particular polymer. However, it is generally about 1.2 times the liquid-liquid transition temperature.

Based on the preceding, the general guidelines for mixing in accordance with this invention are: (1) for the heating cycle, the mixing temperature, $T_H$, is preferably higher than $T_f$ and (2) for the cooling cycle, the mixing temperature $T_C$ is greater than $T_g$ and less than $T_{l,l}$.

For the polychloroprene of this example, measured by DSC,$T_g$ is $-37°$ C., measured by DSC,$T_{l,l}$ was 18° C. and the calculated $T_f$ was 73° C. Referring again to Table III, $T_C$ is 10° C.(between $-37°$ C. and 18° C.) and $T_H$ is 100° C. (greater than 73° C.).

Both the conventionally prepared polychloroprene and the polychloroprene prepared in accordance with this invention were mixed on a two roll mill having rollers 152.4 mm by 304.8 mm. The gum stocks wer made in accordance with ordinary rubber compounding practices. The rollers were provided with internal conduits for carrying heating or cooling liquids. The back roll speed was about 34 rpm and the front roll speed 24 rpm. Rubber curing agents were added during the last cooling cycle to prevent premature crosslinking of the rubber gum stock during the elevated temperature mixing cycles.

Standard 152.4 mm square test slabs were made by curing the conventionally or specially mixed gum stocks at a temperature of 160° C. for 25 minutes. The thickness of the slabs ranged from about 2.45 mm to 1.84 mm. Test specimens were prepared by die cutting ASTM tensile bars having a 25.4 mm gage length.

Uniaxial tensile tests were conducted at room temperature using an Instron tensile test machine. A crosshead speed of 508 mm per minute was used corresponding to an initial strain rate of 0.33 sec$^{-1}$. The dynamic modulus properties were measured by means of a dynamical mechanical analyzer (DMA, DuPont 990). The heating rate used was 5° C. per minute. Fatique tests were conducted using a DeMattia fatigue tester at a vibrational frequency of 5 Hertz and an initial strain of 75 percent. Cryogenic fracture surfaces were obtained by cooling a sample at $-198.5°$ C. and stressing it to break. The fracture surfaces were examined using a scanning electron microscope (ISI-DS 130). Freon permeability was measured at 93.3° C. by means of a Linde volumetric permeability cell in which Freon 22 was used at a pressure of 50 psig. Permanent set was obtained by stretching a rubber specimen up to 300 percent and then unloading and relaxing the specimen for 24 hours. Hysteresis was obtained from stress-strain curves measured on the Instron at 100 percent strain.

Figure 4A:
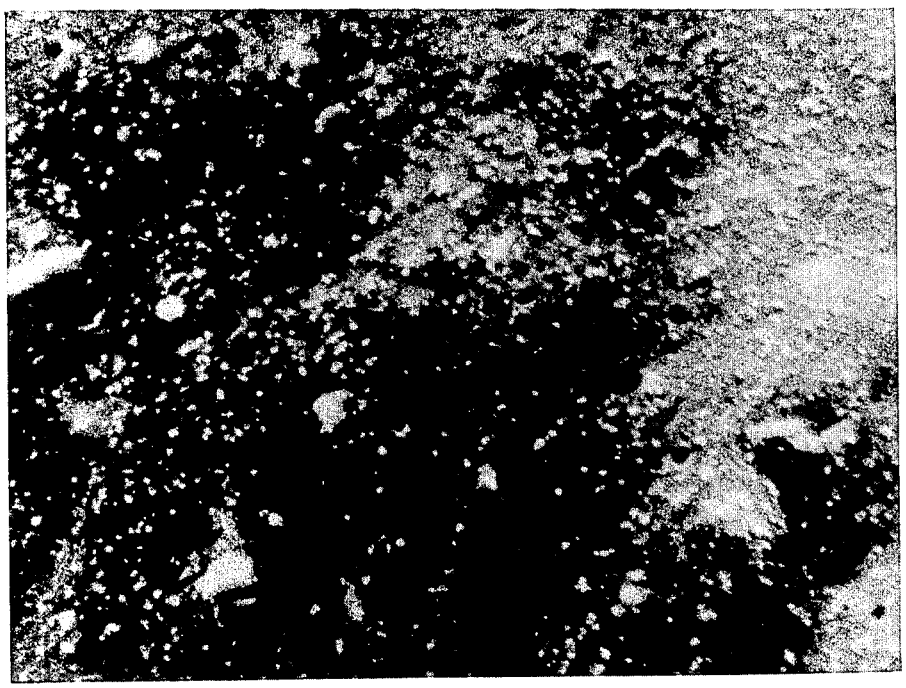
FIG. 4a is a photomicrograph of a low temperature fracture surface of a carbon black filled polychloroprene tensile specimen processed by ordinary methods.
Figure 4B:
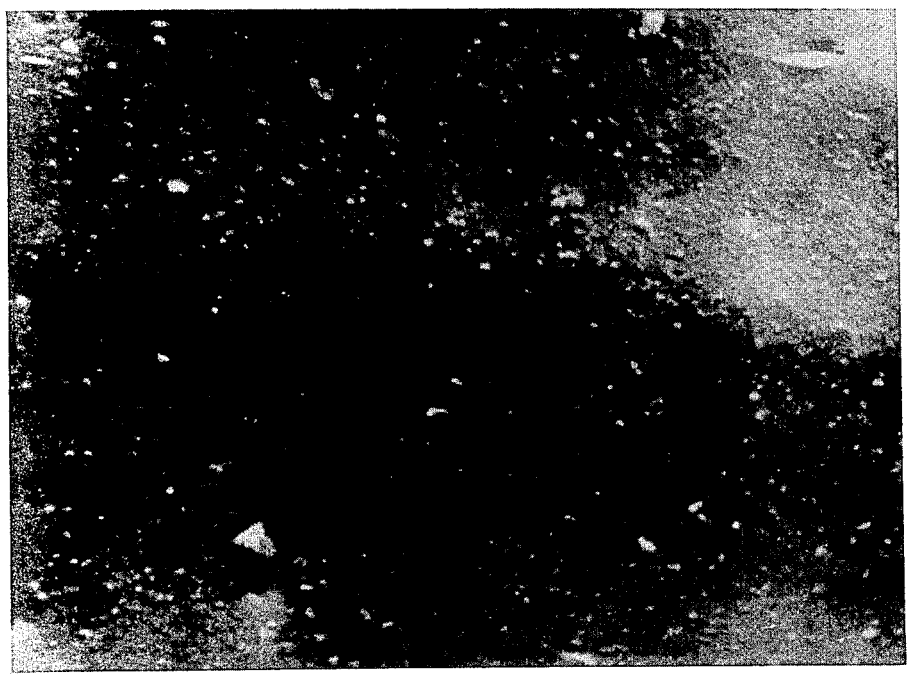
FIG. 4b is a micrograph of a fracture surface of a like sample processed by the subject method.

FIG. 4a shows the cryogenic fracture surface of a tensile specimen of conventional polychloroprene filled with carbon black. FIG. 4b shows the cryogenic fracture surface of a specimen of like polychloroprene containing attrited carbon black and mixed in accordance with this invention. The improvement in the degree of mixing of the subject polychloroprene over the conventionally mixed polychloroprene is quite obvious. The conventional polychloroprene (FIG. 4a) contains many microvoids generally with a size ranging from about $10^{-3}$ to $2 \times 10^{-4}$ mm. Microvoids appear as dark spots on the micrographs, the filler particles are generally white in appearance and the polymer matrix is grey. The average density of the conventionally prepared polychloroprene was about 1.41 grams per cm$^3$. The microvoid concentration of the polychloroprene subjected to hot and cold mix cycles (FIG. 4b) was very much reduced, the density of the rubber being 1.47 grams per cm$^3$. The largest of the microvoids in the specially worked rubber was on the order of $2 \times 10^4$ mm, considerably smaller than that of the conventionally prepared polychloroprene. Furthermore, the magnification of the improved polychloroprene composition of FIG. 4b is 28 times greater than that of the conventionally prepared polychloroprene (FIG. 4a). It is very evident from these photomicrographs that better mixing of neoprene and carbon black is obtained by the subject invention. Additional evidence for this is that the fracture surface of the conventional polychloroprene is very wavy and hilly in comparison with a very flat surface for my specially mixed polychloroprene. This is because a stress induced crack propogates through the weakest spots inside an elastomer system. Poor mixing creates weak regions of elastomer that are not filler reinforced and through which fracture preferentially occurs. Where there is good mixing, as in samples prepared by the subject invention, no preferential path for crack propagation exists and the fracture surface is very flat.

Useful mechanical properties of elastomers, in general, include good tensile strength, high ultimate elongation, long fatigue life, resistance to permanent set, resistance to organic fluids, and elastic hysteresis. Certain of these properties are critical to automotive elastomer design. For example, good automotive engine mounts require an elastomer with long fatigue life as well as low storage modulus, permanent set grease permeability and hysteresis.

TABLE IV

Comparison of the Properties at Room Temperature of Carbon Black Reinforced Polychloroprene Obtained by the Two Mixing Methods

| Property | Invention | Conventional | Percent* Improvement (%) |
|---|---|---|---|
| Tensile strength (MPa) | 23.8 | 19.9 | 18.6 |
| Ultimate elongation (%) | 390 | 285 | 36.8 |
| Fatigue life (cycle) | 151,360 | 109,000 | 38.8 |
| Permanent set (%) | 0.90 | 3.25 | 72.3 |
| Hysteresis at 100% elongation and room temperature | 9.8 | 11.8 | 16.9 |
| Freon-22 Permeability $(cm^4 sec^{-1} dyne^{-1})$ | $7.034 \times 10^{-13}$ | $7.821 \times 10^{-13}$ | 10.1 |

*Percent Improvement (%) $= \frac{[GMR] - [Common]}{[Common]} \times 100\%$

Table IV lists significant property improvements in cured neoprene achieved by the subject mixing method. It should be noted also that all of the physical properties of the polychloroprene mixed in accordance with this invention are superior to those of conventionally prepared polychloroprene.

Figure 2:
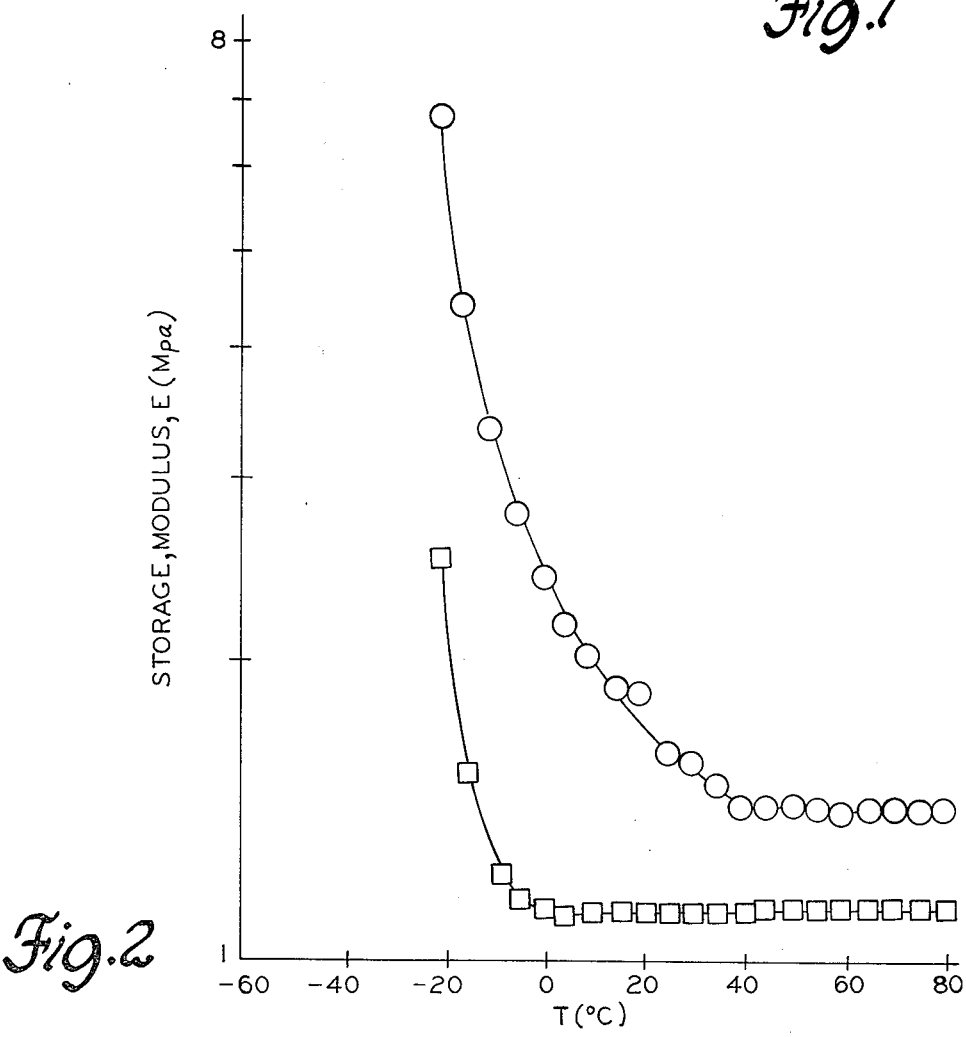
FIG. 2 is a plot of storage modulus as a function of temperature for a conventional polychloroprene composition and a like polychloroprene composition mixed in accordance with the subject invention.

One of the most significant improvements obtained by the practice of the invention lies in the dynamic modulus properties of polychloroprene at low temperatures. Referring to FIG. 2, dynamical mechanical analyzer (DMA) results are plotted for conventional polychloroprene (circular data points) and the polychloroprene prepared in accordance with this example (square data points). It is clear that the temperature sensitivities of the storage modulus E of the two systems is quite different, even though their glass transition temperatures are the same. The storage modulus of the conventionally prepared polychloroprene remained constant down to $-40°$ C. and then gradually increased as the temperature decreased, the polymer approaching the glassy state. The storage modulus of the subject polychloroprene, however, remained constant down to $-10°$ C. and then sharply increased to its glassy state value as the temperature decreased. In other words, through better mixing, achieved by repeated heating and cooling steps, the polychloroprene prepared in accordance with this invention exhibited considerably better low temperature properties and less temperature sensitivity.

TABLE V

Composition of Hot and Cold Worked Polychloroprene for the Sleeves of Air-spring

| | |
|---|---|
| Polychloroprene (Neoprene W) | 100.0 |
| Attrited N330 Carbon Black | 30.0 |
| MgO | 4.0 |
| ZnO | 5.0 |
| Stearic Acid | 0.5 |
| Ethylene Thiourea | 0.5 |
| Sulfur | 0.4 |
| Diphenyl-guanidine | 0.5 |
| Dioctyl sebacate | 20.0 |
| Wingstay 100 (Mixed Diaryl p-phenylenediamine) | 1.0 |
| Nickel dibutyldithiocarbamate | 0.5 |
| 2,2'-Methylene-bis(4-methyl-6-t-butyl phenol) | 1.25 |

EXAMPLE 2

Figure 3:
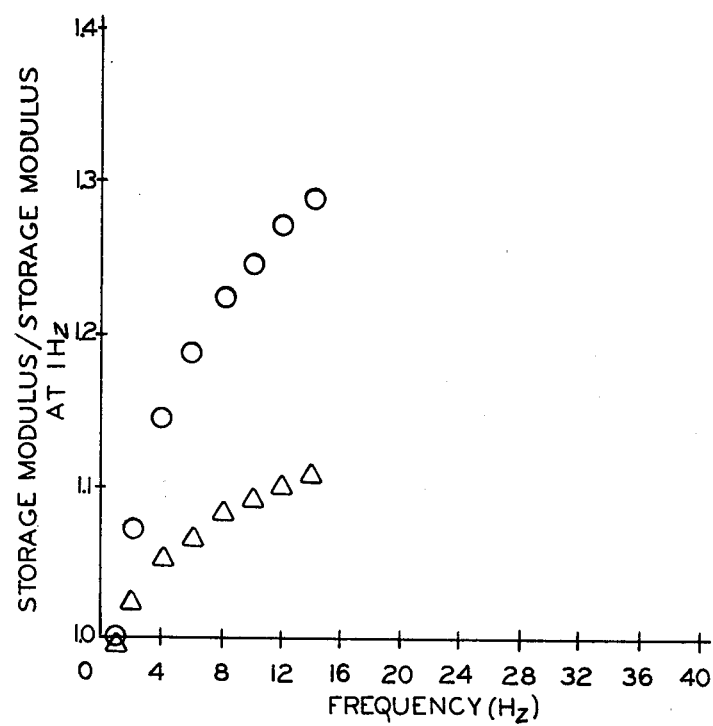
FIG. 3 is a plot of storage modulus as a function of frequency for a commercial elastomer compared to the improved modulus of the same elastomer processed by the subject method.

A polychloroprene composition set out in Table V was prepared in a Banbury mixer according to the schedule set out in Table III of Example 1 above. This composition was made into an air spring sleeve identical to that of an air spring commercially available from Goodyear Rubber Company. FIG. 3 plots the strain rate sensitivity of the two springs. The rate of sensitivity is defined by plotting a storage modulus E at a vibrational frequency of 1 to 16 Hertz divided by the storage modulus of the rubber at 1 Hertz as a function of the vibrational frequency. The data was obtained on an MTS dynamic tester. FIG. 10 clearly indicates that the sleeve made of polychloroprene mixed in accordance with this invention (data points are circles) has much less frequency sensitivity than the commercial sleeve (data points are triangles). For an automotive air spring, this would provide a better softer ride at low temperatures where high frequency-low amplitude vibrational flexing is experienced.

EXAMPLE 3

I have also used a combination of Banbury mixer and Brabender extruder mixing cycles as set forth in Table VI to mix neoprene rubber compositions of the formulation of Table I with attrited N330 carbon black. Referring to FIG. 5, it is evident that where the high sheer mixing at low temperature $T_C$ is done in a Banbury mixer and the high temperature $T_H$ mixing step is done on a Brabender extruder, even better results are achieved than using a Banbury mixer alone.

TABLE VI

| | Mixing Procedure | | | | |
|---|---|---|---|---|---|
| | MIXER | | JACKET | | RUBBER |
| STEP | Type | Speed (RPM) | TEMP (°C.) | TIME (Min) | TEMP. (°C.) |
| 1 | High Shear[a] | 80 | Room | 2 | |
| 2 | High Shear[a] | 80 | 10° C. | 4 | ~75 |
| 3 | Extruder[b] | 100 | 100° C. | 3 | ~125 |
| 4 | High Shear | 80 | 10° C. | 3 | |
| 5 | Extruder | 100 | 100° C. | 3 | |
| 6 | High Shear[c] | 80 | 10° C. | 6 | |

[a]High shear mixing done in Banbury mixer.
[b]Extruding done with Brabender extruder.
[c]Curatives added.

While I have discussed a preferred embodiment of my invention in terms of neoprene rubber containing carbon black, I have also worked with other elastomeric polymers and other fillers and achieved like results. Other elastomers which showed measurably and substantially improved physical properties when the gum stocks are mixed in accordance with the subject cooling and heating steps included bromobutyl rubber, chlorosulfonated polyethylene elastomers, natural rubber and polypropylene oxide elastomers. Other fillers which have been used include ultrafine magnesium silicates, and high surface silicon dioxide. The use of silicon dioxide fillers substantially improves tensile and elongation properties, however, fatigue resistance is lower than with the use of carbon black. Therefore, the invention is clearly applicable to mixing any desired viscous elastomer gum stock with any desired particulate filler.

While my invention has been described in terms of specific embodiments thereof, other forms may readily be adapted by one skilled in the art. Accordingly, my invention is to be limited only by the following claims.

The embodiments of the invention in which an exclusive property or privilege is claimed are defined as follows:

1. A method of improving the physical properties of a crosslinked elastomeric polymer containing a particulate filler comprising the steps of dispersing said filler in the polymer before it is crosslinked; reducing the temperature of the filler and polymer mixture to a temperature between the glass transition temperature and the liquid liquid temperature of the uncrosslinked polymer; working said polymer at said reduced temperature so as to create shear between the polymer and filler to encourage mixing thereof; heating said mixture to a temperature greater than the flow temperature of the uncrosslinked polymer; working said polymer at said elevated temperature such that air bubbles dispersed in the mixture migrate to and are broken at the surface thereof; and repeating said cooling and heating cycles until the particulate filler is uniformly dispersed in the polymer matrix and substantially all the air bubbles are eliminated, said method enhancing the reinforcing effect of the particles in the elastomer after it is crosslinked.

2. A method of improving the reinforcing properties of carbon black in elastomeric polymers comprising the steps of attriting the carbon black particles to substantially reduce their size and lower their pH; mixing said attrited carbon black with the polymer before it is crosslinked; subjecting said mixture to shear stress while it is at a first temperature between the glass transition temperature and the liquid-liquid transition temperature of the uncrosslinked polymer; working said mixture at a second temperature above the flow temperature of the uncrosslinked polymer to eliminate microvoids therein; repeating said steps at said first and second temperatures until the attrited black is uniformly dispersed throughout the uncrosslinked polymer; and thereafter crosslinking said polymer.

3. The method of claim 1 where the elastomeric polymer is polychloroprene.

4. The method of claim 1 where the elastomeric polymer is taken from the group consisting of polychloroprene, polypropylene oxide, chlorosulfonated polyethylene and natural rubber.

5. The method of claim 1 where the improved physical properties include increased tensile strength and ultimate elongation.

6. The method of claim 1 where the particulate filler is carbon black.

7. The method of claim 1 where the particulate filler is silicon dioxide.

8. The method of claim 2 where the elastomeric polymer is polychloroprene.

9. The method of claim 2 where the elastomeric polymer is taken from the group consisting of polychloroprene, polypropylene oxide, chlorosulfonated polyethylene and natural rubber.

* * * * *